| United States Patent [19] | [11] Patent Number: 4,541,672 |
|---|---|
| Fukuta et al. | [45] Date of Patent: Sep. 17, 1985 |

[54] RECLINING ANGLE ADJUSTMENT DEVICE

[75] Inventors: Kinsho Fukuta, Toyota; Makoto Kanamaru, Fujisawa, both of Japan

[73] Assignees: Toyota Jidosha Kabushiki Kaisha, Aichi; Shiroki Kinzoku Kogyo Kabushiki Kaisha, Kanagawa, both of Japan

[21] Appl. No.: 451,001

[22] Filed: Dec. 20, 1982

[30] Foreign Application Priority Data

Dec. 21, 1981 [JP] Japan .................................. 56-191389

[51] Int. Cl.⁴ ............................................. A47C 1/026
[52] U.S. Cl. .................... 297/367; 297/366; 297/379
[58] Field of Search ............... 297/366, 367, 368, 369, 297/379, 361, 378, 370, 371, 354, 355

[56] References Cited

U.S. PATENT DOCUMENTS

| 3,058,148 | 10/1962 | Beierbach et al. | 297/369 |
| 4,103,964 | 8/1978 | Klingelhofer et al. | 297/367 |
| 4,223,947 | 9/1980 | Cremer | 297/367 |
| 4,337,978 | 7/1982 | Kazaoka et al. | 297/367 |
| 4,394,048 | 7/1983 | Sakurai et al. | 297/367 |

*Primary Examiner*—William E. Lyddane
*Assistant Examiner*—Mark W. Binder
*Attorney, Agent, or Firm*—Birch, Stewart, Kolasch & Birch

[57] ABSTRACT

A reclining angle adjustment device including a pair of locking mechanisms provided at either side of a seat. One locking mechanism cooperates with the other by means by connecting mechanism which includes a play therein. Thus, movement caused by one locking mechanism is transmitted relatively delayed to the other locking mechanism thereby preventing the locking mechanisms from being half-locked based on inconsistency of parts.

6 Claims, 7 Drawing Figures

RECLINING ANGLE ADJUSTMENT DEVICE

BACKGROUND OF THE INVENTION

The present invention relates to a reclining angle adjustment device for a reclining seat for cars, airplanes and so forth for adjusting the inclination of the seat back, more particularly, to a reclining angle adjustment device for a reclining seat which includes a pair of locking mechanisms comprising racks and pawl members, each pair of rack and pawl members being provided at either side of the seat and controlled to be engaged with and disengaged with each other by operation of a single handle.

In a reclining angle adjustment device including locking mechanisms provided at either side of a seat (i,e, an inner side and outer side of a seat), both locking mechanisms are designed to be operated, locked and unlocked almost simultaneously. Thus, in the art, a pair of release arms provided on locking mechanisms at either side of the seat are connected to each other by a connecting pipe thereby locking and unlocking the locking mechanisms by way of rotating a release arm which is provided at the outer side of the seat.

However, in the above fabrication, some disadvantages will appear where a gap exists between the outer locking mechanism and the inner locking mechanism with regard to their locking positions as illustrated hereinafter. That is, in this construction, there is no degree of freedom regarding to mutual movements between outer and inner locking mechanisms since both of them are connected with a connecting pipe as an integral body. Accordingly, when one of release arm reaches a locking position, the outer release arm may fall into an unlocking position since the latter cannot reach a locking position because of the existence of a gap between outer and inner locking mechanisms. Actually, the amount of movement, which is a distance between the stopping position of a release arm in the half-locked position and the locked position thereof to be reached, is difficult to keep zero since there exists inconsistences in parts thereof and constructions. Accordingly, when the types of devices belonging to the prior art are provided on a coach and so forth, either one of the locking mechanisms will fall into a half-locked position. Thus, the seat back becomes unstable and inconvenient for a passenger to sit thereon.

SUMMARY OF THE INVENTION

It is a principal object of the present invention to provide a reclining angle adjustment device which can prevent a locking mechanism secured at either side of a seat from being half-locked.

It is another object of the present invention to provide a reclining angle adjustment device which is simple in construction, being facile and inexpensive to manufacture.

The foregoing and other objects, features and advantages of the invention will be apparent from the following more particular description of the preferred embodiments of the invention as illustrated in the accompanying drawings.

BRIEF DESCRIPTION OF THE DRAWINGS

FIG. 2 is a sectional view taken along the line II—II in FIG. 1 in which FIG. 2a is a sectional view of an outer reclining angle adjustment device whereas FIG. 2b is a sectional view of an inner reclining angle adjustment device;

DETAILED DESCRIPTION OF THE INVENTION

Figure 1:
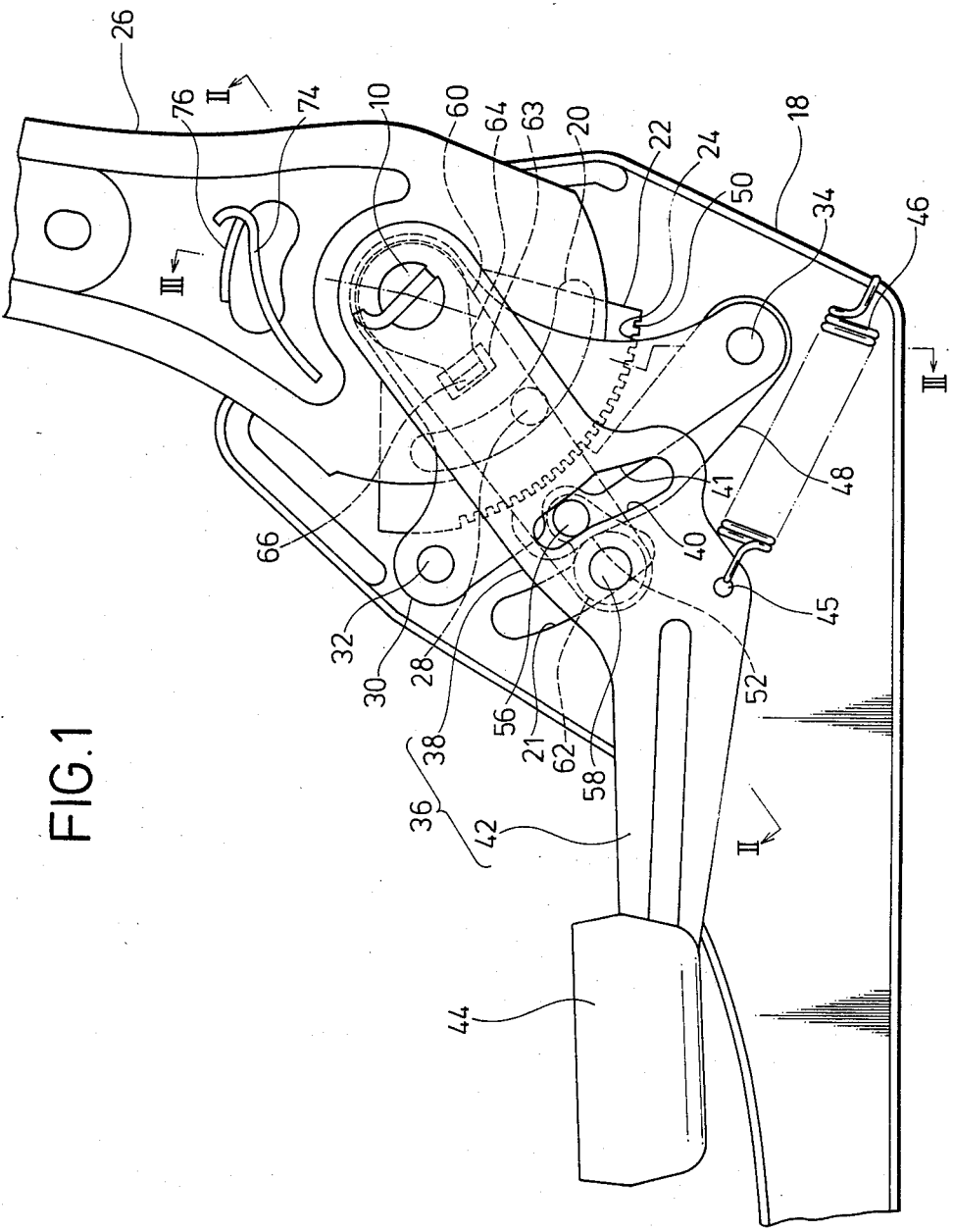
FIG. 1 is a side view of a reclining angle adjustment device according to the present invention.
Figure 2:
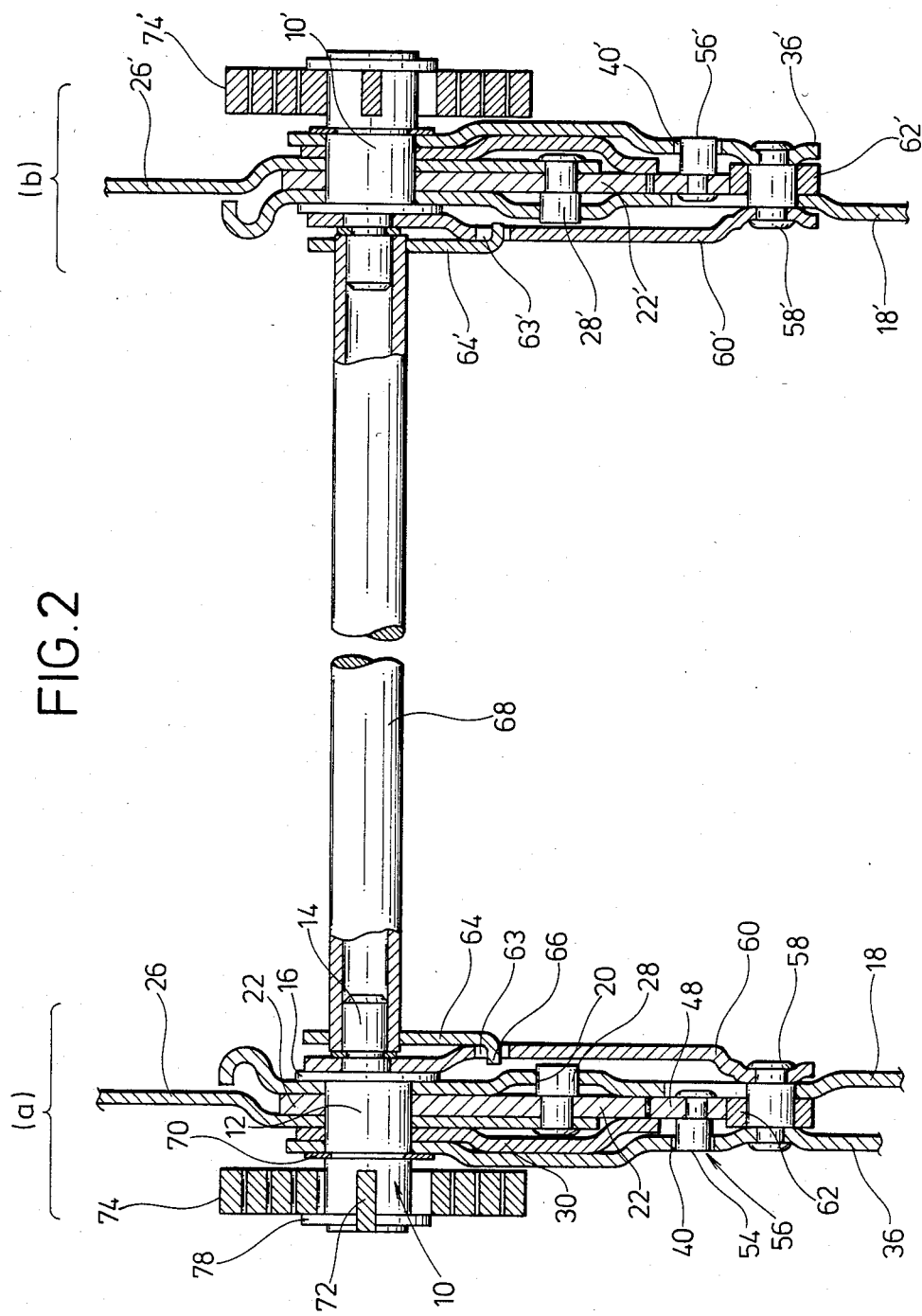
Figure 3:
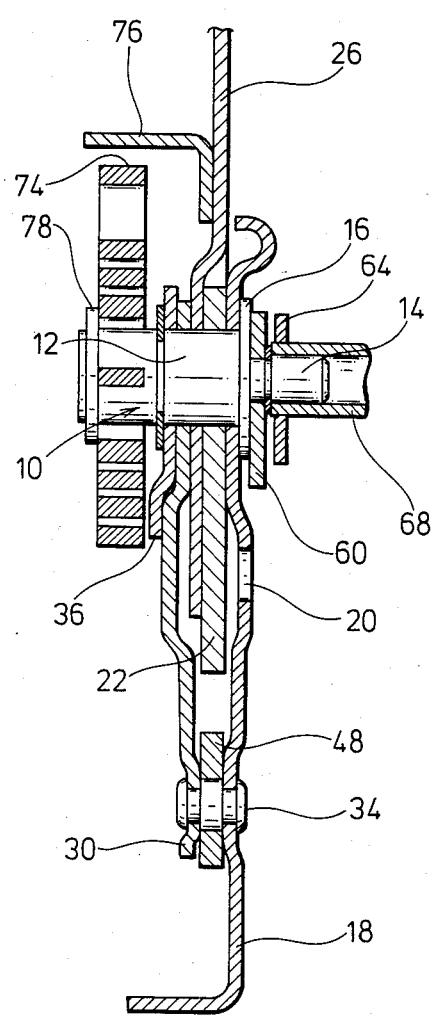
FIG. 3 is a sectional view taken along the line III—III in FIG. 1 showing an outer reclining angle adjustment device.

In FIG. 1 through 3, a main shaft 10 basically comprises a large diameter portion 12, a small diameter portion 14 and a flange 16 being provided therebetween. Large diameter portion 12 is inserted into a hole 19 provided at the upper portion of a lower arm 18 until a side surface of the flange 16 abuts thereon. A circular arc shaped hole 20 is provided under the hole 19 and in the lower arm 18. A flexed type "L" shaped hole 21 is provided in the lower arm 18 for positioning an arm hinge pin.

A rack 22 is rotatably mounted on the large diameter portion 12 of the main shaft 10. As is apparent from FIG. 1, the rack 22 may be constructed in an arc or fan shape with a number of teeth being provided at a lower extremity of the arc shape thereof. Rack 22 is connected with upper arm 26 by means of a pin 28 so as to fix the upper arm 26 to the seat back. One enlarged end portion of the pin 28 is positioned in the hole 20 of the lower arm 18 so as to be movable therein. Thus, a moving range of the ratchet 22 is set which is limited to the length of the arc type opening of the hole 20.

A reinforcing member 30, slidable over the upper arm 26, is mounted on the main shaft 10. Reinforcing member 30 is made of a metal plate of the type which is a distorted triangle in shape. As described above, an upper end portion of reinforcing member 30 is in engagement with main shaft 10 while one corner of its lower portion is fixed to lower arm 19 through a pin member 32 whereas the other corner thereof is fixed to the lower arm 18 through a pin member 34. A release arm 36 is rotatably mounted on enlarged diameter portion 12 of main shaft 10 through a hole formed at an upper end portion thereof.

As shown in FIG. 1, release arm 36 is made of plain metal having two arm members 38 and 42 one of which is elongated upwardly whereas the other of which is elongated horizontally from the center thereof. Upper arm member 38 includes a cam-hole 40 provided at the middle portion thereof while lower arm member 42 includes a handle 44 on the extremity of the lower arm member 42. One end of a tension spring 46 is engaged with a small hole 45 provided at a lower end portion below the center of the release arm 36 whereas the other end thereof is engaged with the lower arm 18 thereby pulling the release arm 36 counterclockwise, i.e. to maintain release arm 36 in a locked position.

A pawl member 48 is rotatably mounted on pin member 34 positioned between the lower arm 18 and reinforcing member 30. Pawl member 48 includes a number of teeth 50 at a free end portion thereof engagable with teeth 24 of rack 22 while a gently-sloping surface 52 is formed at a lower back portion thereof. The pawl member 48 includes a pin member 56 with an enlarged head portion 54 which is inserted into a cam-hole 40 to move therein corresponding to rotation of release arm 36 as illustrated hereafter.

A small diameter portion of an arm hinge pin 58 is mounted on release arm 36 and an arm plate 60, respectively. While an enlarged diameter portion provided at its center holds a cylindrical spacer 62. Spacer 62 abuts on the back portion 52 of pawl member 48 when being locked. Spacer 62 will move within hole 21 provided in lower arm 18 corresponding to rotation of release arm 36 where it is unlocked and spacer 62 is detached from the back portion 52. A relatively small hole is formed at the upper portion of arm plate 60 to receive small diameter portion 14 main shaft 10. A hole of oblong type 63 is provided at a middle portion of arm plate 60. The width of hole 63 is significant whereas the length thereof does not matter. That is, the width of hole 63 should be selected to be wider than the width $W_2$ of hook portion 66 of connecting hook 64 so as to permit play between release arm 36 and 36' as illustrated hereafter, which is largwer than the gap of the locking position as described above. For example, the value of the expression $W_1-W_2$ is selected from approximately two (2) mm through five (5) mm. Connecting hook 64 is secured to a connecting pipe 68 fitted to the small diameter portion 14 of main shaft 10 by making use of a small hole formed at a rounded portion thereof. Hook portion 66 is inserted into the hole 63.

Lower arm 18, rack 22, upper arm 26, reinforcing member 30 and release arm 36 are positioned on the main shaft 10 adjacent to each other and are fitted thereon by a snap ring 70. A slit 72 which extends diametrically is provided in one end of main shaft 10. One end portion of spiral spring 74 is engaged with the slit 72 and fitted rigidly on main shaft 10 by means of a washer 78 whereas the other end is hung on a projection 76 projecting from upper arm 26 (refer to FIGS. 1 and 3) so that the seat back, not shown, is activated forwardly by means of spiral spring 74.

Figure 4:
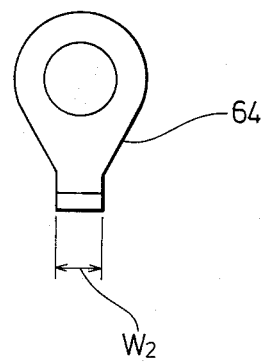
FIG. 4 is a front view of a connecting hook incorporated in a reclining angle adjustment device according to the present invention.
Figure 5:
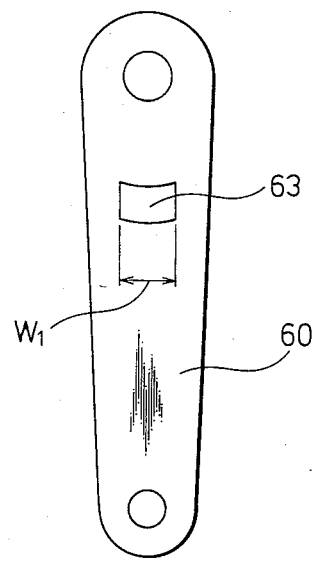
FIG. 5 is a front view of an arm plate which is engaged with the connecting hook shown in FIG. 4.
Figure 6A:
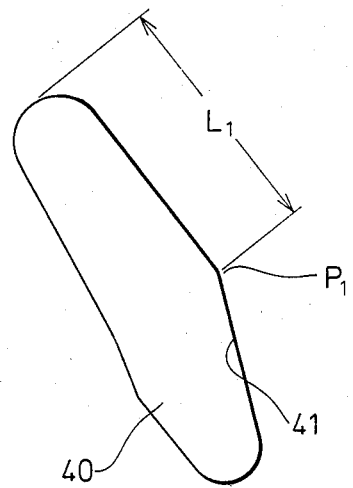
FIG. 6a is a view illustrating a guide hole provided in a release arm.
Figure 6B:
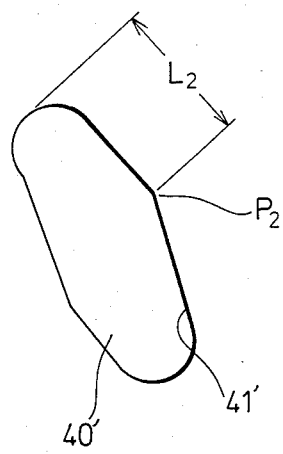
FIG. 6b is a view illustrating a guide hole provided in a release arm.

FIG. 2b shows a locking mechanism attached to the inner side of the seat back. However, the fabrication of it is almost similar to the outer locking mechanism except for a few points. Thus, similar parts are numbered similar to those in FIG. 2a with the addition of a "'" (prime). Different points between inner and outer locking mechanism are illustrated hereafter. On the inner side it is unnecessary to provide a handle to rotate a release arm 36' so the release arm 36' does not include a lower arm. The shape of a cam-hole 40' provided in the inner side adopts a little different shape from the cam-hole 40. That is, as shown in FIG. 6a, the distance "$L_1$" between the end portion of the cam-hole 40 and point $P_1$ where pin member 56 initiates abutment with a cam face 41 is selected to be larger than the distance "$L_2$", as shown in FIG. 6b, between the end portion of cam hole 40' and point $P_2$ where pin member 56' initiates abutment with a cam face 41'. Furthermore, the distance $L_1-L_2$ is determined by taking account of the distance of play $W_1-W_2$, as illustrated in FIGS. 4 and 5.

In operation, the reclining angle adjustment device according to the present invention functions as follows. When a passenger (not shown) pulls handle upwardly against elasticity of tension spring 46, release arm 36 rotates clockwise around main shaft 10 as well as arm hinge pin 58 and arm plate 60. Accordingly, spacer 62 transfers along back surface 52 of pawl member 48. Then, after moving a predetermined distance, spacer 62 detaches from back surface 52 of pawl member 48. At this point, pawl member 48 is released from restraint of the spacer 62. Furthermore, as release arm 36 rotates clockwise, cam surface 41 of cam-hole 40 abuts pin member 56 so as to transfer pin member 56 to be separated from rack 22 corresponding to clockwise rotation of release arm 36. Thus, rack 22 will be able to rotate freely since pawl member 48 is disengaged from rack 22 by way of rotation of release arm 36 which is already released so that the device itself becomes unlocked. Consequently, after being unlocked, the passenger can obtain the best inclination of the seat back by inclining thereof with upper arm 26 positioned forwardly or backwardly.

When the passenger releases the handle 44, after obtaining the best inclination, spacer 62 again abuts on back surface 52 of pawl member 48 since spacer 62 comes down within the flexed hole 21 by means of tension spring 46. As transferring spacer 62, pawl member 48 rotates clockwise around pin member 34 so that teeth 50 become engaged with teeth 24. Pawl member 48 as well as spacer 62 stops its rotation when teeth 50 are rigidly engaged with teeth 24. Consequently, spacer 62 falls into the locking position. At the time when the spacer 62 again abuts on the back surface of pawl member 48, cam surface 41 does not disturb any transferring action of the spacer 62 to the locking position since cam surface 41 is detached from the pin member 56.

The operation of release arm 36 is transmitted to the locking mechanism of inner side through connecting pipe 68. That is, arm plate 60 rotates due to the rotation of release arm 36 so as to transmit the rotation to connecting hook 64. However, this does not mean that connecting hook 64 starts to rotate. Because of the existence of play corresponding to a value $W_1-W_2$, connecting hook 64 initiates its rotation after arm plate 60 rotates a predetermined distance so as to transmit the operation to the locking mechanism of the inner side. Movement of the inner locking mechanism will transmit through the connecting hook 64', arm plate 60' and release arm 36' in this order.

In a process where the release arm 36 rotates clockwise to release the locked status and pin members 56 and 56' are within the distance $L_1$ and $L_2$ of cam-holes 40 and 40', respectively, cam faces 41 and 41' do not abut on the pin member 56 and 56', respectively, so as to maintain pawl members 48 and 48' in a stable position. Because of the existence of play or lost motion $W_1-W_2$, initial rotation of the release arm 36 is not transmitted to the inner release arm 36'. However, pawl member 48 will start to rotate proceeding the rotation of pawl member 48' provided that the distance $L_1$ is equal to the distance $L_2$. Accordingly, to accomplish the simultaneous rotations between pawl members 48 and 48', the length of $L_1$ is selected to be longer than the length of $L_2$ so that initial rotation of pawl member 48 will be delayed corresponding to delayed operation of release arm 36' based on play $W_1-W_2$ (in the above embodiment play $W_1-W_2$ is provided at either side of inner and outer locking mechanism). Thus, the rotating range of release arm 36 is larger than the range of the release arm 36'. That is, the quantity of increased operation of release arm 36 based on play $W_1-W_2$ will counteract the difference of $L_1-L_2$ of the cam-holes 40 and 40' so that initial operation timing of pawl members 48 and 48' will be consistent with each other.

According to the present invention the locking status of both sides are simultaneously released as well as avoiding a half-locking condition. As illustrated above, handle 44 is released to lock the locking mechanism. In the device according to the present invention, spacer 62' reaches back surface 52' of pawl member 48' earlier than spacer 62 reaches back surface 52 of pawl member 48 because of the existence of play between arm plates 60, 60' and connecting hook 64, 64', respectively. Thus, the inner locking mechanism will be locked earlier than the outer locking mechanism because of play so that release arm 36' will stop prior to release arm 36. However, release arm 36 may rotate within a range corresponding to play $W_1-W_2$ without any interuption of release arm 36'. Thus, the outer locking mechanism does not fall into a half-locked position even if there is a gap between the locking positions of release arms 36 and 36'. That is, release arms 36 and 36' are transferred with tension springs 46 and 46' to a position where pawl members 48 and 48' are rigidly engaged with racks 22 and 22', respectively, after spacers 62 and 62' abut on back surfaces 52 and 52' of pawl members 48 and 48', respectively.

According to the present invention, as illustrated above, a half locked condition is avoided in the reclining angle adjustment device including two locking mechanisms, which are simple in fabrication, provided at either side of the seat, respectively.

While the invention has been particularly shown and described with respect to a preferred embodiment thereof, it will be understood by those in the art that various changes in form and detail may be made therein without departing from the spirit and scope of the invention. For example, the play may be provided at any place along the connecting mechanism.

What is claimed is:

1. A reclining angle adjustment device comprising:
   a first locking mechanism including a first upper arm provided at one side of a seat, a first lower arm rotatably mounted on a main shaft with said first upper arm, a first rack fixed to said first upper arm, a first pawl member mounted on said first lower arm and a first release arm with a cam hole into which a pin member mounted on said first pawl member enters for disengaging said first pawl member with said first rack;
   a second locking mechanism including a second upper arm provided at the other side of said seat, a second lower arm rotatably mounted on said main shaft with said second upper arm, a second rack fixed to said second upper arm, a second pawl member mounted on said second lower arm and a second release arm with a cam hole into which a pin member mounted on said second pawl member enters for disengaging said second pawl member with said second rack; and
   connecting means for transferring the movement between said first and second locking mechanisms including a first arm plate operatively mounted on a first main shaft with said release arm, a first connecting hook connected with said first arm plate through a play, a second arm plate operatively mounted on a second main shaft with said second release arm, a second connecting hook connected with said second arm plate through a play and a connecting pipe on which said first connecting hook and said second connecting hook are affixed thereto, respectively, wherein a distance between the end portion of said cam hole provided in said first release arm and a point where said pin member begins to contact a face of said cam hole is different from a distance between the end portion of said cam hole provided in said second release arm, and a point where said pin member begns to contact a face of said cam hole and the difference in both distances corresponds to a quantity of play provided between the arm plate and connecting hook.

2. A reclining angle adjustment device according to claim 1, wherein said first release arm includes a handle manually rotatable about said first main shaft and the distance between the end portion of said cam hole provided in said first release arm and the point where said pin member begins to contact a face of said cam hole is selected to be longer than the distance between the end portion of said cam hole provided in said second release arm and the point where said pin member begins to contact a face of said cam hole.

3. A reclining angle adjustment device for use with a reclining seat comprising:
   a first upper arm and lower arm being positioned on one side of the reclining seat;
   a second upper arm and lower arm being positioned on the other side of the reclining seat;
   main shaft means for rotatably connecting said first upper and lower arms and said second upper and lower arms;
   a first rack being operatively connected to said first upper arm and being rotatably mounted to said main shaft means;
   a second rack being operatively connected to said second upper arm and being rotatably mounted to said main shaft means;
   a first pawl being operatively connected to said first lower arm and being selectively, lockingly engageable with said first rack;
   a second pawl being operatively connected to said second lower arm and being selectively, lockingly engageable with said second rack;
   a first release arm being rotatably mounted to said main shaft means on said one side of the reclining seat;
   a second release arm being rotatably mounted to said main shaft means on said other side of the reclining seat;
   a first spacer operatively connected to said first release arm and being selectively engageable with said first pawl; and
   a second spacer operatively connected to said second release arm and being selectively engageable with said second pawl;
   a first arm plate operatively connected to said first release arm and including a first enlarged slot provided therethrough;
   a second arm plate operatively connected to said second release arm and including a second enlarged slot provided therethrough;
   a first connecting hook secured to said main shaft means and including a hook portion loosely connected through said first enlarged slot in said first arm plate with a space therebetween to produce a lost motion;
   a second connecting hook secured to said main shaft means and including a hook portion loosely connected through said second enlarged slot in said second arm plate with a space therebetween to produce a lost motion;

rotation of said first release arm provides a disengagement of said first spacer from said first pawl and correspondingly a disengagement of said first pawl from said first rack to unlock said first upper arm relative to said first lower arm and said first enlarged slot in said first arm plate provides a lost motion produced by the delayed rotation of said first hook in said first enlarged slot and imparts rotation through said main shaft means to said second release arm to disengage said second spacer from said second pawl and correspondingly disengage said second pawl from said second rack to unlock said second upper arm relative to said second lower arm;

wherein said first release arm includes a first cam path of a predetermined length being disposed within the thickness of said first release arm, said first pawl includes a first cam pin positioned within said first cam path and said second release arm includes a second cam path being disposed within the thickness of said second release arm and being a shorter predetermined length relative to said first cam path, said second pawl includes a second cam pin positioned within said second cam path wherein the lost motion and the difference in length between said first and second cam path results in a disengagement of said second pawl from said second rack simultaneously with the disengagement of said first pawl from said first rack.

4. A reclining angle adjustment device according to claim 3, wherein said first release arm further includes a handle for manually rotating said first release arm about said main shaft means.

5. A reclining angle adjustment device according to claim 3, wherein said main shaft means includes a first shaft portion engageable with said first upper and lower arms and a second shaft portion engageable with said second upper and lower arms, said first and second shaft portions being operatively connected together by a connecting pipe.

6. A reclining angle adjustment device according to claim 3, and further including a spring for normally biasing said first release arm into a locking position wherein said first pawl is in locking engagement with said first rack.

* * * * *